Nov. 5, 1968    P. G. R. KING ET AL    3,409,370
APPARATUS FOR MEASUREMENT OF LENGTHS AND OF OTHER
PHYSICAL PARAMETERS WHICH ARE CAPABLE OF
ALTERING AN OPTICAL PATH LENGTH
Filed Nov. 21, 1963
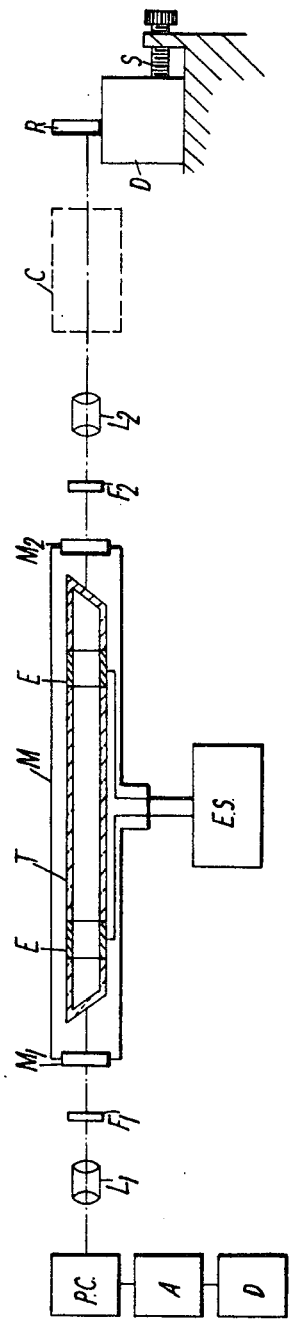
INVENTORS
Percy George Robert King
Graham John Steward
By Cushman, Darby & Cushman
ATTORNEYS

United States Patent Office 3,409,370
Patented Nov. 5, 1968

3,409,370
APPARATUS FOR MEASUREMENT OF LENGTHS AND OF OTHER PHYSICAL PARAMETERS WHICH ARE CAPABLE OF ALTERING AN OPTICAL PATH LENGTH
Percy George Robert King, Baldock, and Graham John Steward, Hitchin, England, assignors to National Research Development Corporation, London, England, a corporation of Great Britain
Filed Nov. 21, 1963, Ser. No. 325,315
Claims priority, application Great Britain, Nov. 22, 1962, 44,192/62
7 Claims. (Cl. 356—51)

ABSTRACT OF THE DISCLOSURE

The following specification discloses apparatus for the measurement of lengths and other physical parameters which are capable of altering an optical path length comprising a laser provided with an external reflector at one end to return into the laser some of the radiation emitted therefrom, the optical path distance of the external reflector from the laser being controllable, either by actual physical movement of the external reflector or by alteration of the nature of the medium in which the radiation is propagated, and detector means disclosed at the other end of said laser for monitoring the intensity of emitted radiation.

---

This invention is concerned with masers, principally optical masers or "lasers" in which the amplification process derived from a suitably excited gas discharge is used in combination with an optical resonator to produce oscillations at wavelengths in the visible or infra-red. A part of these oscillations can be coupled out of the resonator to produce a beam of coherent radiation of extremely narrow bandwidth. The invention is not normally applicable to those existing solid state masers which produce pulses of radiation, but a solid state maser producing C.W. radiation could be used.

We have found that a very high percentage modulation or effective interruption of the oscillation strength can be produced by feeding back into the maser a small proportion of the emitted energy of appropriate phase, adjusted, for instance, by variation of the effective distance travelled by the reflected, fed back energy.

In one aspect, therefore, the invention comprises a maser provided with an adjustable external reflector to return into the maser some of the radiation emitted from it, the optical path distance of the external reflector from the maser being controllable, either by actual physical movement of the external reflector or by alteration of the nature of the medium in which the reflection external to the maser occurs so as to change the propagation through it of the emitted coherent radiation.

The modulation of the maser oscillation strength depends on the length of the reflecting path external to the maser in terms of the wavelength of the emitted radiation, and maximum modulation changes can be detected as the optical path distance changes by half wavelengths. With an optical maser of the gaseous type the resulting modulation effects is sufficiently great to be easily detectable with an ordinary photocell and amplifier. The wavelength of the radiation from an optical maser can be of the order of a few thousand angstroms, so that the modulated maser can be incorporated into a very effective precision measuring instrument capable of measurements of lengths and velocities with extreme precision. Measurements can be made over distances which are far beyond the capabilities of conventional optical interferometers because the coherence length of the maser radiation is so much greater than that of ordinary light.

Since the emission of coherent radiation from an optical maser can occur from both ends of the maser structure, a particularly neat arrangement is to locate the modulation control reflector at one end of the maser and to provide at the other end a detector (e.g., a photocell and amplifier) to indicate the modulating changes produced by alterations in the position of the reflector.

An optical measuring instrument of this character is illustrated diagrammatically by way of example, in the accompanying drawing.

In this arrangement the maser M can consist of a tube T containing a gas or mixture of gases (e.g., helium and neon) and provided with external or internal electrodes E, E for R.F. or D.C. excitation respectively by suitable supplies S and aligned plane or curved, partly silvered or multi-layer dielectric film reflectors $M_1$, $M_2$ to produce the back and forth reflections of energy which result in the emission of coherent radiation through the ends of the maser structure M. The radiation emitted from one end of the maser is detected by a photocell P.C. and its associated amplifier A and indicator D. At the opposite end of the maser structure is an external reflector R which can be an ordinary mirror or multilayer reflector or corner prism or other structure designed to reflect radiation back accurately along its original path into the maser again.

Maximum sensitivity of the system is obtained by using a plane maser output mirror $M_2$ with a multi-layer dielectric reflecting surface giving the maximum possible transmission consistent with the reflectivity being high enough to support maser oscillations. Mirror $M_1$ would be slightly concave and would have the highest possible reflectivity. Typically for 6,328 angstrom operation, $M_1$ would have a 15 layer magnesium fluoride/zinc sulphide reflecting surface with about 0.1% transmission and a radius of curvature of about 2 metres, while $M_2$ would be plane and would have 9 or 11 dielectric layers giving a transmission of about 1%.

The distance from the maser of the external reflector, and any object O or body on which it is mounted, is adjustable, for instance by a micrometer screw mechanism S, and as the length of the optical path between the external reflector and the nearer reflector $M_2$ of the maser structure changes through successive half wavelengths of the maser radiation, the indicator actuated by the photocell shows corresponding cycles of maximum and minimum readings as the radiation is modulated. Thus, the movements of the external reflector can be very accurately determined and this enables extremely precise measurements of lengths to be made and very accurate scale calibrations obtained.

Even when only a very small part of the emitted radiation is reflected back into the maser by the external reflector, e.g., about 1/10 of 1%, the modulating effect on the stimulated radiation from the maser is still easily observable.

The proportion of radiation returned to the maser can be increased in some cases by the use of a suitable optical system $L_2$. It is also sometimes helpful to concentrate the radiation from the other end of the maser on to the photocell with a further optical system $L_1$, and to insert suitable selective optical filters $F_1$ and $F_2$ in the emergent beams from the maser to allow only radiaiton of the required operating wavelength to pass to the photocell and external reflector respectively.

With the addition of precision timing devices, the apparatus would be capable of measuring velocities to extreme accuracy over large distances.

As an alternative to distance measurements by actual movement of the external reflector, the apparatus could be used for determination or measurement of any other changes affecting the optical path between the maser and the external reflector, e.g. pressure changes or alterations in the nature or composition of a gaseous or other medium interposed in that optical path. In such a case, a test cell C containing the medium, changes in the optical propagation characteristics of which are to be measured, is interposed as shown in dotted outline between the maser M and the external reflector R, which is kept fixed after initial setting up adjustments.

By taking advantage of the possibilities of obtaining a number of discrete different wavelengths from a maser, as by operating in different resonator modes, or by utilizing other atomic transitions in the same active medium, it may also be possible to obtain modulation effects which could give relatively coarse and fine measurements of a given distance.

An alternative, and very useful, method of operation of the apparatus is possible with certain gas discharge optical maser systems. In these systems it is posible for an atom in an upper excited energy state to decay radiatively to one or other of two different energy states, and for each of these transitions to be used for producing maser oscillations at its appropriate wavelength. Since each of the oscillations uses a common source of upper energy level excited atoms, they are coupled together so that modification of the oscillation intensity of one affects the intensity of the other. A similar situation could occur for two transitions sharing a common lower energy level.

As an example, the helium/neon maser may be considered. The 6,328 angstrom transition shares its upper level with a transition corresponding to $3.39\mu$. Both of these under the proper conditions can oscillate, either separately or together. If such a maser operating on both wavelengths simultaneously is used in the apparatus already described, movement of the additional external reflector will not only cause modulation of the $3.39\mu$ oscillation strength through one cycle for each movement of the reflector through successive half wavelengths of the $3.39\mu$ radiation and the simultaneous modulation of the 6,328 angstrom oscillation strength through one cycle for each movement of the external reflector through one half wavelength of that wavelength, but also, due to the intercoupling effect, the strength of the 6,328 angstrom oscillation will be weakened whenever the strength of the $3.39\mu$ oscillation is strengthened and vice versa. Consequently the strength of the 6,328 angstrom oscillation will also be cyclically modulated at a rate corresponding to movements of the external reflector through successive half wavelengths of the $3.39\mu$ radiation.

Thus a red sensitive photodetector can be used to measure changes of optical length in terms of the much longer infra-red wavelength, while the visible beam of red radiation can initially be used for aligning the whole system.

The required arrangement of the apparatus would be as shown in FIG. 1 with a filter $F_1$ transmitting only in the region of 6,328 angstrom and filter $F_2$ only in the region of $3.39\mu$. Filter $F_2$ can be removed when required to utilize the red radiation for aligning the external reflector R.

Mirror $M_2$ might in this case need a 15 layer dielectric reflecting surface designed for operation at 6,328 angstrom in order for the reflectivity at $3.39\mu$ to be sufficient to maintain oscillations at both 6,328 angstrom and $3.39\mu$. However, special mirrors could be designed to give better characteristics for the combination of wavelengths.

We claim:
1. Apparatus for measuring the optical propagation charactertistic of a medium contained in a test cell comprising a maser structure and means for the supply of excitation energy thereto to stimulate the emission of radiation from the maser, a reflector located externally of the maser structure in the path of the radiation emitted from the maser, said test cell being disposed between said maser and said reflector in the path of said emitted radiation, said reflector being positioned to return at least part of said radiation back along its original path through said test cell and into the maser to interact with the stimulated radiation therein and thereby to modulate the amplitude of the stimulated radiation in accordance with the optical propagation characteristic of said medium, detecting means responsive to amplitude changes in the emitted radiation and indicating means connected to said detector for indicating the changes in said optical propagation characteristic.

2. Measuring apparatus comprising a gas laser incorporating an excitable gas filled tube within an optical resonator stimulating the emission therefrom of radiations of more than one wavelength, an external reflector positioned beyond one end of said resonator in the path of the emitted radiation, said reflector being positioned to return part at least of said radiation back along its original path into said resonator and thereby modulate the emitted radiation, means for controlling the optical path length of said external reflector from said resonator, a detector of emitted radiation located beyond the other end of said resonator and indicating means responsive to said detector output, selective optical filter means positioned in the path of said emitted radiation from said laser to allow only radiation of the required operating wavelength to pass to said detector and said external reflector respectively.

3. Measuring apparatus as claimed in claim 2 in which said external reflector is adjustable in position along the path of the emitted radiation from said laser.

4. Measuring apparatus as claimed in claim 2 and having interposed between said laser and said external reflector a test cell through which the emitted radiation passes and containing a medium whose changes in optical propagation characteristics are to be investigated.

5. Measuring apparatus for measurement of lengths and other physical parameters which are capable of altering an optical path length comprising a gas laser incorporating an excitable gas filled tube within an optical resonator stimulating the emission therefrom of radiation both in the visible region and in the infra-red region, an external reflector positioned beyond one end of said resonator in the path of the emitted radiation, said reflector being positioned to return part at least of said radiation back along its original path into said resonator and thereby modulate the emitted radiation, means for controlling the optical path distance of said external reflector from said resonator, a detector of emitted radiation located beyond the other end of said resonator and indicating means responsive to said detector output, selective optical filter means positioned in the path of said emitted radiation from said laser to allow only radiation in the visible region to pass to said detector and only radiation in the infra-red region to pass to said external reflector.

6. A method for measuring a characteristic employing a gas laser incorporating a gas filled tube fitted with electrodes supplied from an excitation source and in combination with an optical resonator to stimulate the emission of radiation from the laser and a reflector positioned beyond one end of said resonator in the path of radiation emitted therefrom to reflect energy back into said resonator, comprising the steps of:
 (a) varying the optical path length between said reflector and optical resonator in accordance with said characteristic and
 (b) detecting variations in the output of said laser as a measurement of said characteristic.

7. The method of claim 6 wherein said characteristic is the distance between a first point and a second point and wherein said optical path length is varied by moving said reflector from said first point to said second point and wherein variations in the amplitude of the output of said laser are detected as said reflector is moved from said first point to said second point as an indication of the distance therebetween.

References Cited

UNITED STATES PATENTS

| | | | |
|---|---|---|---|
| 3,187,270 | 6/1965 | Kogelnik et al. | 331—94.5 |
| 3,243,722 | 3/1966 | Billings | 331—94.5 |

JEWELL H. PEDERSEN, *Primary Examiner.*

B. J. LACOMIS, *Assistant Examiner.*